United States Patent [19]
Larson

[11] Patent Number: 5,801,838
[45] Date of Patent: Sep. 1, 1998

[54] METHOD AND DEVICE TO IMPROVE PRINT QUALITY OF GRAY SCALES AND COLOR FOR PRINTERS

[75] Inventor: Ove Larson, Vastra Frolunda, Sweden

[73] Assignee: Array Printers AB, Sweden

[21] Appl. No.: 859,541

[22] Filed: May 20, 1997

Related U.S. Application Data

[63] Continuation of Ser. No. 264,456, Jun. 23, 1994, which is a continuation-in-part of Ser. No. 844,622, Mar. 26, 1992, abandoned.

[30] Foreign Application Priority Data

Oct. 4, 1989 [SE] Sweden ................... 8903273

[51] Int. Cl.$^6$ .................. H04N 1/40; H04N 1/46; G01D 9/42; G01D 15/14
[52] U.S. Cl. .................. 358/298; 358/459; 358/534; 347/131; 347/254
[58] Field of Search .................. 358/298, 455–459, 358/501, 503, 534, 535; 395/108, 112; 347/130, 131, 141, 172, 183, 188, 232, 238, 254

[56] References Cited

U.S. PATENT DOCUMENTS

| | | | |
|---|---|---|---|
| 3,922,484 | 11/1975 | Keller | 358/459 X |
| 4,092,650 | 5/1978 | Hinz | 346/155 |
| 4,149,183 | 4/1979 | Pellar et al. | 358/534 |
| 4,498,090 | 2/1985 | Honda et al. | 346/159 |
| 4,672,432 | 6/1987 | Sakurada et al. | 358/75 |
| 4,680,645 | 7/1987 | Dispoto et al. | 358/298 |
| 4,736,254 | 4/1988 | Hetera et al. | 358/298 X |
| 4,969,052 | 11/1990 | Ishida et al. | 358/457 |
| 5,055,923 | 10/1991 | Kitagawa et al. | 358/298 X |
| 5,077,615 | 12/1991 | Tsuji | 358/298 |
| 5,258,849 | 11/1993 | Tai et al. | 358/298 |
| 5,309,246 | 5/1994 | Barry et al. | 358/298 |
| 5,337,167 | 8/1994 | Hiratsuka et al. | 358/534 X |
| 5,359,431 | 10/1994 | Ng | 358/457 |

FOREIGN PATENT DOCUMENTS

| | | |
|---|---|---|
| 0292292 | 5/1988 | European Pat. Off. |
| 6084071 | 10/1983 | Japan. |
| 60-103871 | 11/1983 | Japan. |

*Primary Examiner*—Eric Frahm
*Attorney, Agent, or Firm*—Ostrolenk, Faber, Gerb & Soffen, LLP

[57] ABSTRACT

Method to improve the printing quality at reproduction of half-tone originals by means of printers of the type, in which a number of dots are brought together in a cell (pixel). A minimum of two dots form a cell where each dot in the cell is controlled individually with respect to the size and/or the color value. The dots form a pattern in each cell, which is variable with respect to the number of dots, the dot size and/or the dot color value.

14 Claims, 16 Drawing Sheets

FIG. 14
PRIOR ART
FIG. 15
PRIOR ART
FIG. 16
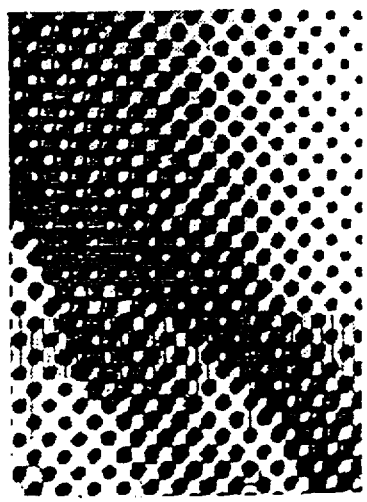
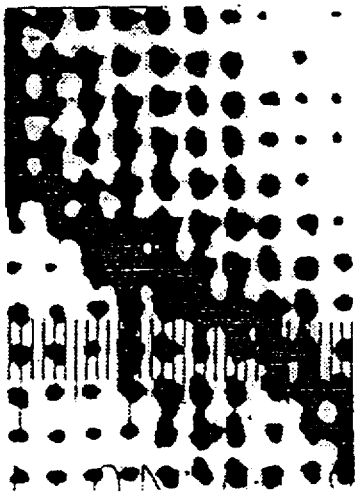
FIG. 14a
PRIOR ART
FIG. 15a
PRIOR ART
FIG. 16a

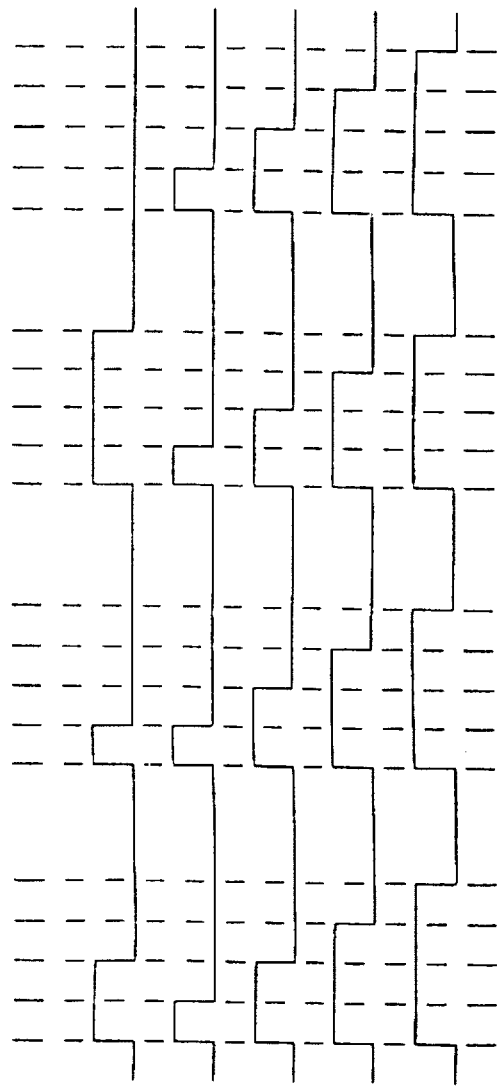

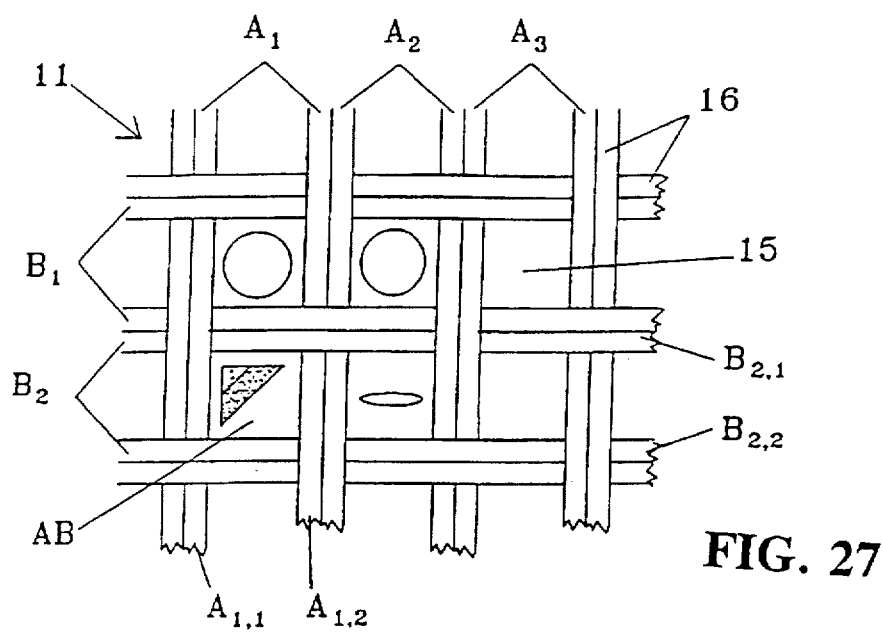
FIG. 27
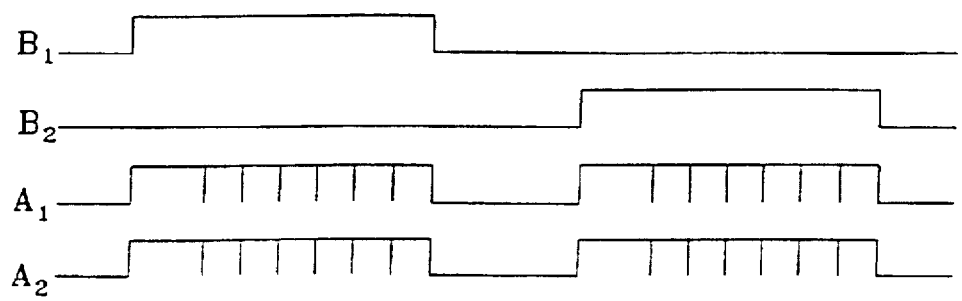
FIG. 28
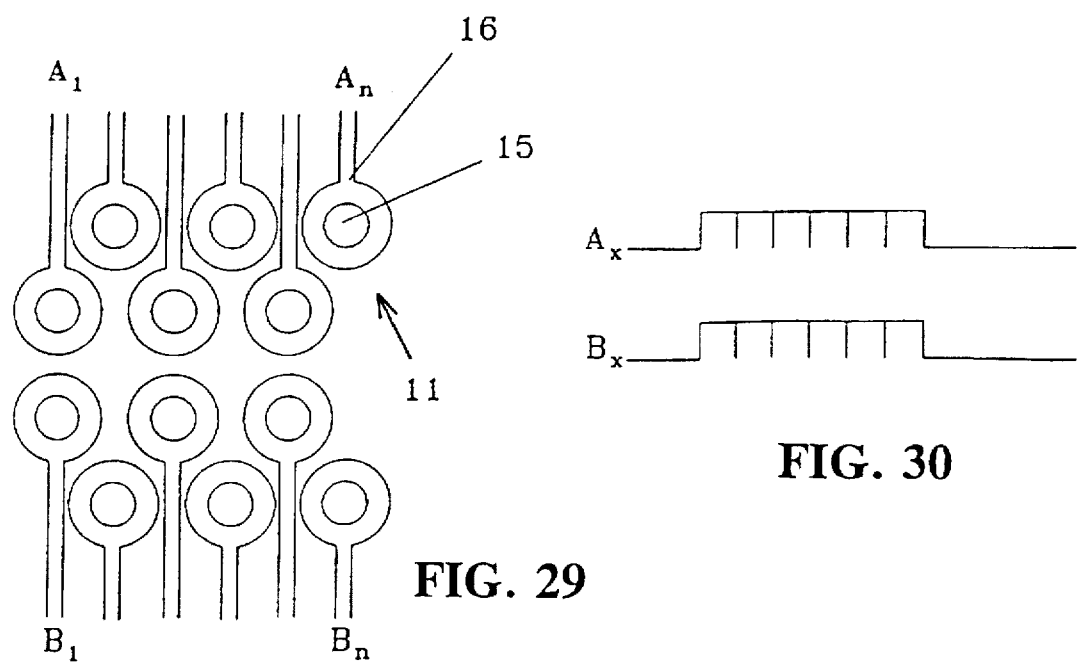
FIG. 29
FIG. 30

METHOD AND DEVICE TO IMPROVE PRINT QUALITY OF GRAY SCALES AND COLOR FOR PRINTERS

CROSS-REFERENCE TO RELATED APPLICATION

This is a Continuation of application Ser. No. 08/264,456 filed on Jun. 23, 1994, which is a continuation-in-part of U.S. Ser. No. 07/844,622, filed Mar. 26, 1992 and entitled "Method to Improve Printing Quality of Grey Scales and Color for Printers" now abandoned.

BACKGROUND OF THE INVENTION

This invention refers to a method to improve the printing quality at reproduction of half-tone originals by means of printers of the type in which a number of dots are brought together in a cell (pixel).

Digital reproduction of grey scale or half-tone pictures demands that the grey-tones are converted to screen dots, the size and division of which is proportional to the perceived blacking impression. That is, sparsely distributed small dots are perceived as a light shade while large dots lying closely together are interpreted by the eye as a dark shade. This technique is used today in all forms of reproduction of half-tone pictures where the printing method is not able to vary the blackness in every single screen dot or other unit area in the printed picture.

However in certain printing methods the blackness in the screen dots of the picture can be varied.

In most of the methods used today for printing from computers there are no possibilities to change the size and/or the blackness of the dots of the printers, without simultaneously reducing the resolution of the print and thereby reducing the quality of the print.

The method which thereby is most common, consists of bringing together the increments of the printer, referred to herein as dots, into cells (or pixels) in which cells the number of written dots is directly related to the size of the cell. This technique is called dithering.

A great deal of research has been devoted to quantify the perceived quality of grey scale pictures as a function of the resolution (cells/inch) of the printed picture and the number of grey tones. A rule of thumb in this case may be that the product of resolution and the number of grey-tones, here called Q, should be some thousands, within certain limits for the cell resolution and the number of grey-tones contained.

In FIGS. 14 to 16 this dependence is illustrated, wherein FIG. 14 shows how a conventional photographic technique is able to reproduce grey-tones. The resolution (cells/inch) in this picture is defined by the photographic contact screen that has been used, e.g., 120 cells/inch, (or 120 lines per inch as is recommended by the nomenclature in this connection). The number of grey-tones in FIG. 14 can be regarded as large and only limited by the grain size in the photographic film. The rectangles 9 in FIGS. 14–16 are shown enlarged in FIGS. 14A, 15A and 16A. The conventional photographic technique gives a very high Q-value.

FIG. 15 shows how the same picture has been reproduced by means of a dithering technique in a laser printer with a resolution of 300 dots/inch, which techniques cannot change either the size of the dot or the dot blackness. This picture is produced with a cell resolution of 75 cells/inch, that is every cell contains 4×4 dots which in FIG. 15 gives 16 grey-tones in addition to the purely white area in the grey-scale. Hereby the Q-value will be 17×75=1275, which should be regarded as optimal capability of a laser printer used in the reproduction of half-tone pictures.

Swedish patent no. 8704883-1 (=PCT-SE88-00653) describes a method of developing pictures and text with pigment particles on an information carrier, directly from computer generated electrical signals, without need for these signals to be intermediately stored at a temporary conversion to light energy, which is the case in photo conductive printers, e.g., laser printers. This has been solved by bringing the information carrier into electrical cooperation with at least a screen or gate formed matrix, preferably an electrode matrix, which through control in accordance to desired configuration of the pattern, at least partly opens and closes passages through the matrix by galvanic connection of this to at least a voltage source and by thus opened passages an electrical field is set free for attraction of the pigment particles towards the information carrier. This method (henceforth called the EMS-concept), as it is described in the above patent, makes it possible to individually control the size and/or blackness of the dots.

Another method which makes the control of the size and/or blackness of the dots possible is contained in photoconductive printers the light source of which consists of an array of light emitting diodes, so called LED-printers, in which the emitted amount of light and/or light energy of the light emitting diodes is individually controllable.

Large efforts in research and development are made today on printer concepts which allow this type of dot-size or dot-density control. Common to all these methods is that the printing speed is related to the number of sizes and/or degrees of blacking. That is, if a picture with Q-value is to be printed, the printing speed of the printer has to be substantially reduced.

Another problem for this type of printing method resides in the repetition accuracy for the different dot sizes and degrees of dot blacking respectively. A grey-scale picture should contain at least ten grey-scales to be recognized as lifelike. In those cases where pigment particles are used to generate the blackness the number of well limited and repeatable dot sizes and/or degrees of blacking of the dots can be limited.

To sum up it can be mentioned that even if printing methods with control of the size of the dots and/or blackness are developed in order to improve grey-scale reproduction, this technique will not substantially influence the customers benefit since the printers will be slow and/or limited to a too small number of grey-tones.

The same technique which has been described here, can be applied to reproduction of color scales, where the colors magenta, cyan and yellow together can be mixed by means of dots of different sizes to cells with new colors. Even here the customers benefit is limited by speed performance and the number of colors in accordance to the above.

SUMMARY OF THE INVENTION

The object of the invention is to create a method which improves the printing quality for grey-tones and color in printers which can control and change the size and/or the degree of blacking of the dots of the printer. The object here is to make printing possible of a large number of grey-tones or colors with good repetition accuracy and uniform quality. Moreover the invention does not require that the printing speed of the printer has to be reduced in corresponding degree as would be the case when using only control of the size of the dots and/or blackness, for many types of printers.

These problems have been solved by employing a number—minimum two—of dots to form a cell where each dot in the cell is controlled individually with respect to the size and/or the color value and that the dots form a pattern in each cell, which is variable with respect to the number of dots, the dot size and/or the dot color value. By creating cells consisting of at least two individually controllable dots as for size and/or blackness, the number of perceived grey-tones can be substantially increased in comparison to what can be reproduced each by dot control and dithering technique respectively. The need for a number of well limited and repeatable dot sizes and/or blacking degrees of the dots hereby can be made smaller, whereby the speed of the printer does not need to be reduced as much.

This technique, herein called DDC (Dot & dithering Control), gives EMS, LED and other printer concepts improved performance when printing grey-scales and at reproduction of color. In FIG. 16 the quality is exemplified of a grey scale picture with a Q-value over 3000, which can be achieved with a printer with the resolution 300 dots/inch and four dot sizes.

DESCRIPTION OF THE DRAWINGS

The invention will be described below in greater detail with reference to accompanying drawings, which show some embodiments.

FIGS. 14–16 shows the difference between different reproduction methods while FIGS. 14a–16a show enlargements of portions of FIGS. 14–16, respectively.

FIGS. 19A–19E schematically show timing diagrams for control voltage levels employed in another method of image forming.

FIG. 27 illustrates schematically one embodiment of electrode means employed in the present invention.

FIG. 28 shows timing diagrams for the embodiment of FIG. 27.

FIG. 29 illustrates schematically an alternative embodiment of electrode means employed in the present invention.

FIG. 30 shows timing diagrams for the embodiment of FIG. 29.

DETAILED DESCRIPTION OF THE PREFERRED EMBODIMENTS

By influencing geometries and other parameters in the EMS-concept the dependence of the dots to the control voltage of the electrodes can be changed.

The dots illustrated in the figures shown represent a grey-scale but instead of grey-tones, the dots can have any tone of color.

Figure 1:
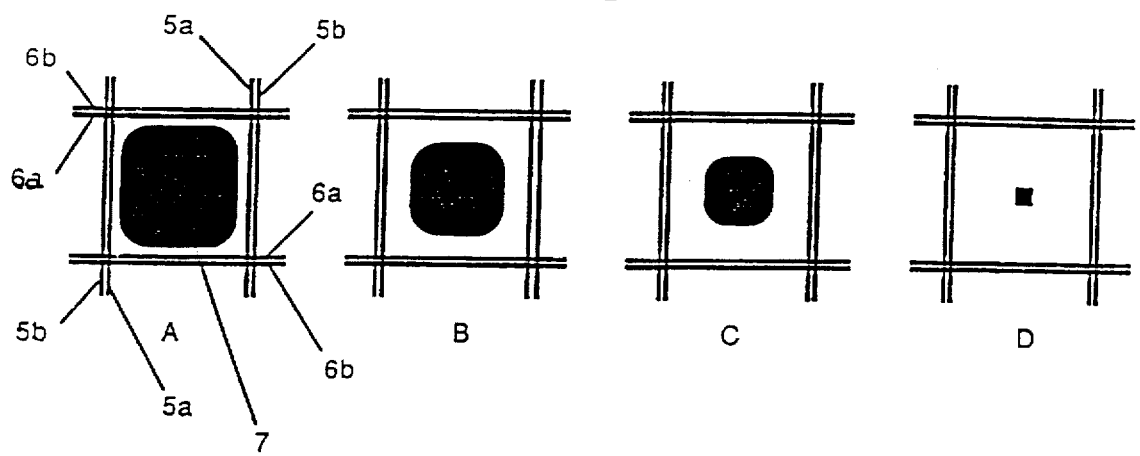
FIG. 1 shows four sections, e.g. in the form of a mesh of an electrode matrix and diagrammatically the control of the dot size according to the EMS-concept.
Figure 2:
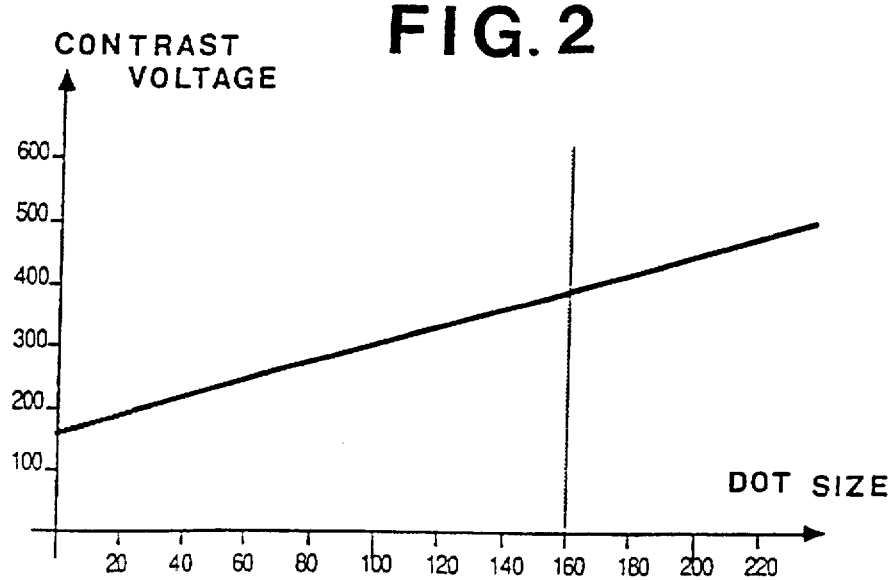
FIG. 2 shows in a diagram how the potential of the electrodes in the FIG. 1 affects the dot size.

FIGS. 1 and 2 diagrammatically in an enlargement show how the size of the dot 7 only can be changed by varying the contrast voltage of the electrodes 5a and 6a, which are included in an electrode matrix.

Figure 4:
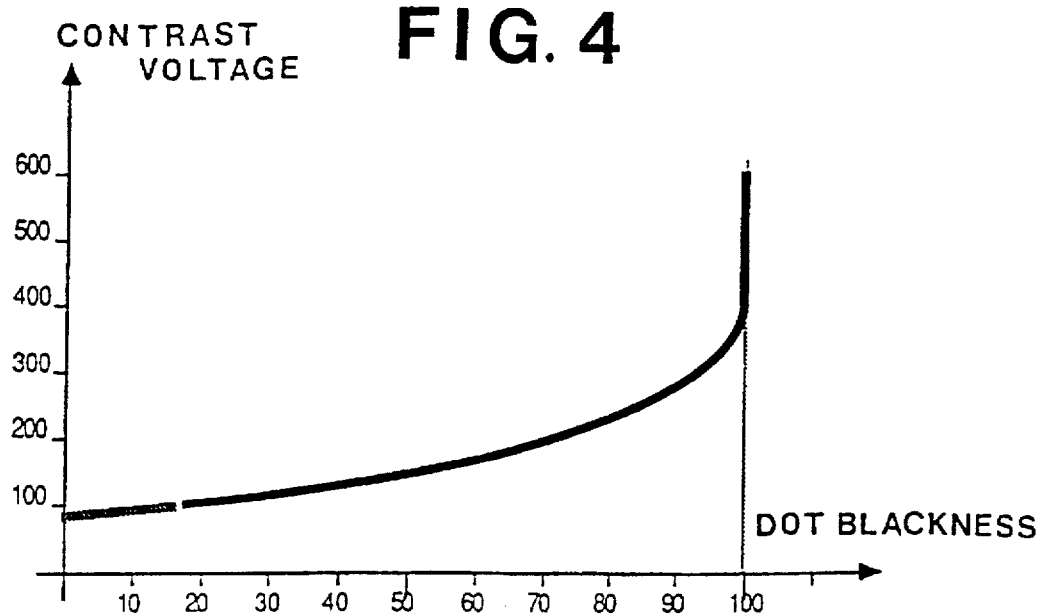
FIG. 4 shows in a diagram how the potential of the electrodes in FIG. 3 influences the dot blackness.
Figure 6:
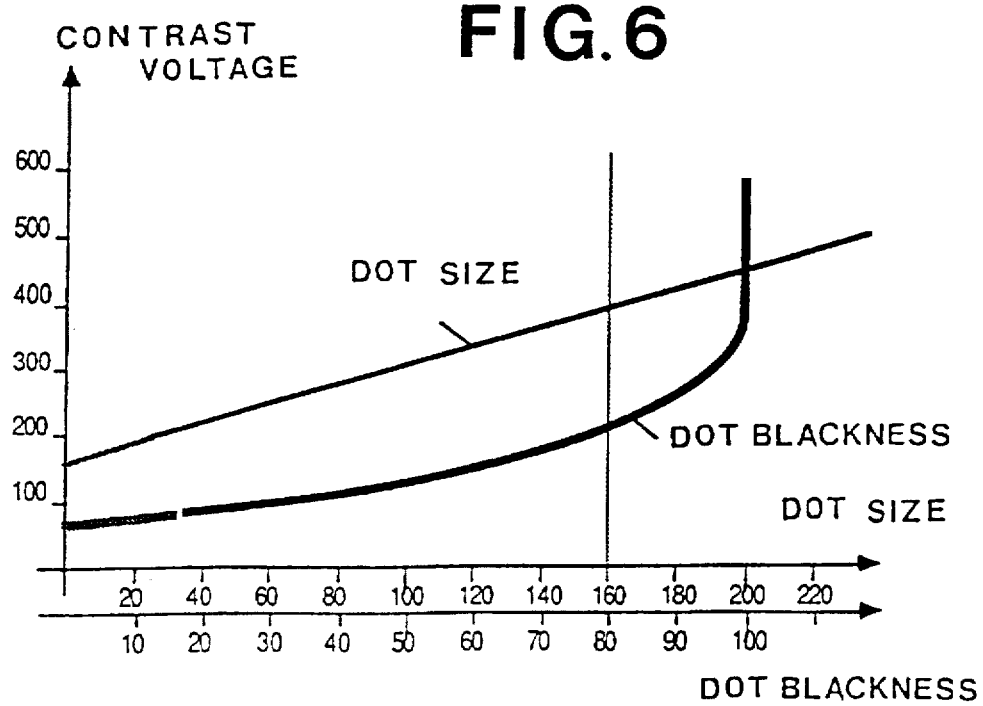
FIG. 6 shows in a diagram how the potential of the electrodes in FIG. 5 influences the dot size and the blackness.

The values on the axes in the diagrams in FIGS. 2, 4 and 6 only constitute examples. The shaded line in the diagrams in FIGS. 2, 4 and 6 diagrammatically show how the parameter-dependence is somewhat uncertain.

Figure 3:
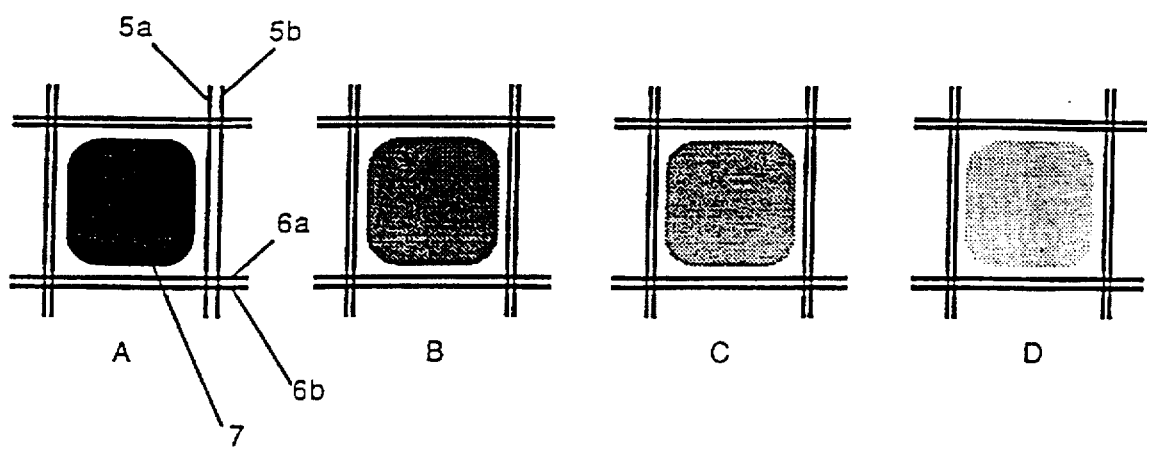
FIG. 3 shows four sections, e.g. in the form of a mesh of an electrode matrix and diagrammatically the control of the dot blacking according to the EMS-concept.
Figure 5:
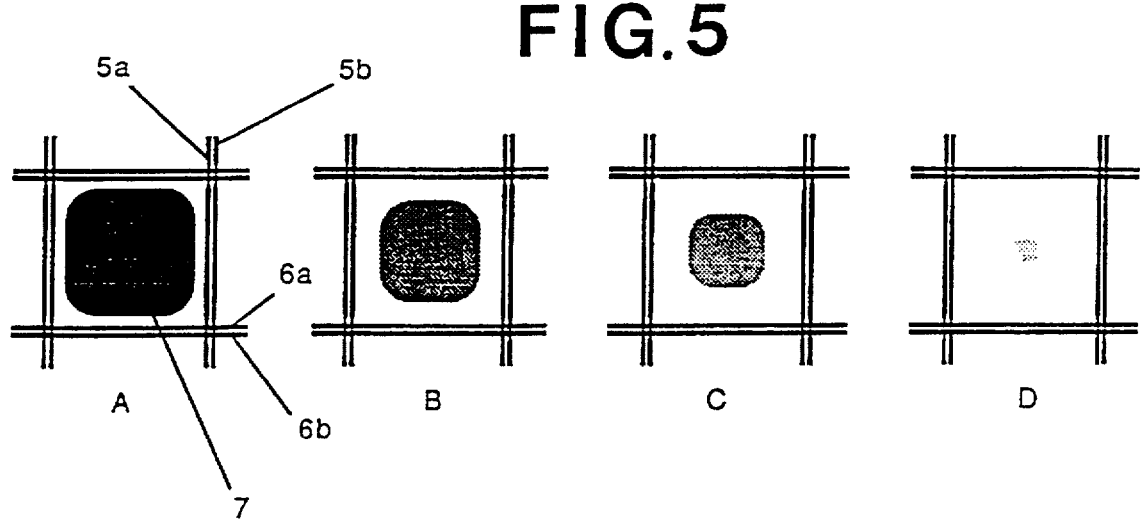
FIG. 5 shows four sections, e.g. in the form of a mesh of an electrode matrix and diagrammatically the control of dot size and blackness according to the EMS-concept.

FIGS. 3 and 6 show diagrammatically how only the blacking degree of dot 7 (in %; of which 100% represents completely black and 0% represents completely white) is influenced by the potential at the electrodes 5a and 6a. FIGS. 5 and 6 show diagrammatically how both the size and the blacking degree of the dot 7 is influenced by the potential at the electrode 5a and 6a. By changing e.g. the intensity of field between the information carrier and the developing roller (see the Swedish patent 8704883-1), the coupling between dot size and blackness can be changed. FIG. 6 only constitutes an example of such a coupling.

Figure 7:
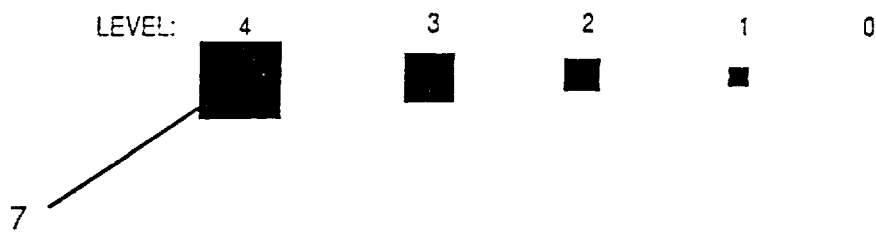
FIG. 7 shows four dots of different sizes in addition to 0-level which represents the absence of a dot.
Figure 8:
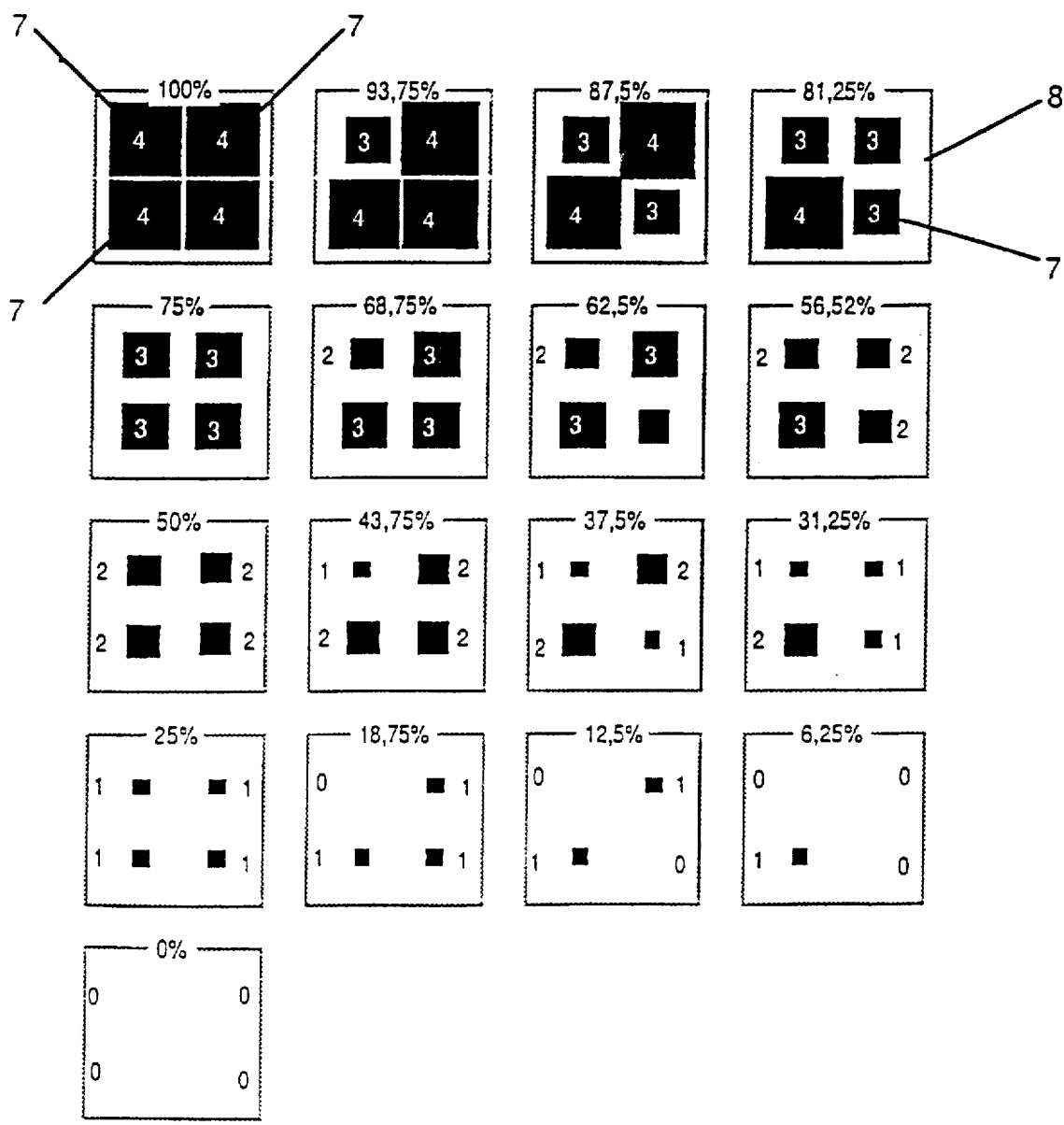
FIG. 8 shows diagrammatically how the dithering technique can be combined with control of the dot size at five levels.

FIG. 8 shows diagrammatically and enlarged an embodiment of the method according to the invention where four dots together form a cell 8. Each cell is on the top indicated by a percent number (e.g. 62,5%) which aims at showing the perceived degree of blacking for the whole cell 8 observed in natural size. Every dot can be printed in four different sizes 1, 2, 3 and 4, which is shown in FIG. 7. The absence of a dot, the 0-level in FIG. 7 also represents a state, which with advantage can be used to increase the number of perceived grey-tones of the cell 8.

Conventional dithering technique in this example only should offer four grey-tone levels of the cell 8 (100,75,50 and 25%) in addition to the completely white state (0%). By combining the control of the size of the dots in five levels in the embodiment shown the number of grey-tones perceived from the cell 8 can be increased to 16 (100% 93.5%, 87.5%, ... , 6.25%) plus the completely white state (0%). This is carried out by the first state 100% of the cell 8 which contains four dots 7 in size 4. The first grey-tone 93.75% after the completely black cell 100% is represented by one of the dots 7 being reduced in size at level 3. In the subsequently following grey-tone 87.5%, a further dot 7 has been reduced to size 3. In this case it can be advantageous to choose the diagonally placed dot 7, which is shown in FIG. 8, since the eye in this case finds it more difficult to dissolve the internal structure of the cell. The pattern according to which the dots are changed in the cell 8 is however according to the invention not fixed to the pattern shown, but can be carried out according to quite different sequences. For pedagogic reasons it has been chosen to present one and the same sequence in the drawings. In the cell 8 which is represented by the grey-tone 81.25% three of the dots 7 of the cell 8 have been reduced to size 3 whereby only one dot 7 has maintained its original size 4.

In the subsequently following grey-scale 75% all dots 7 in the cell 8 have been reduced to size 3. The principle for changing the grey-scale for the whole cell 8 then follows the same description as the one given above. The absence of a dot "level 0" in FIG. 7 is used as a structure element in the lightest grey-tones 18.75, 12.5, 6.25 and 0%.

For pedagogic reasons it has been chosen here to show the dimensional relation of the dots as linear. The perception of the eye of the degree of blacking is however not linear either to the size of the cell or to the size of the dots contained in the cell 8.

Figure 9:
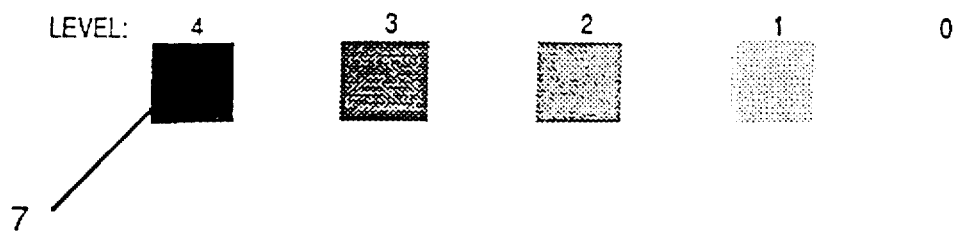
FIG. 9 shows four different blacking degrees of dots of equal size plus a 0-level which represents the absence of a dot.
Figure 10:
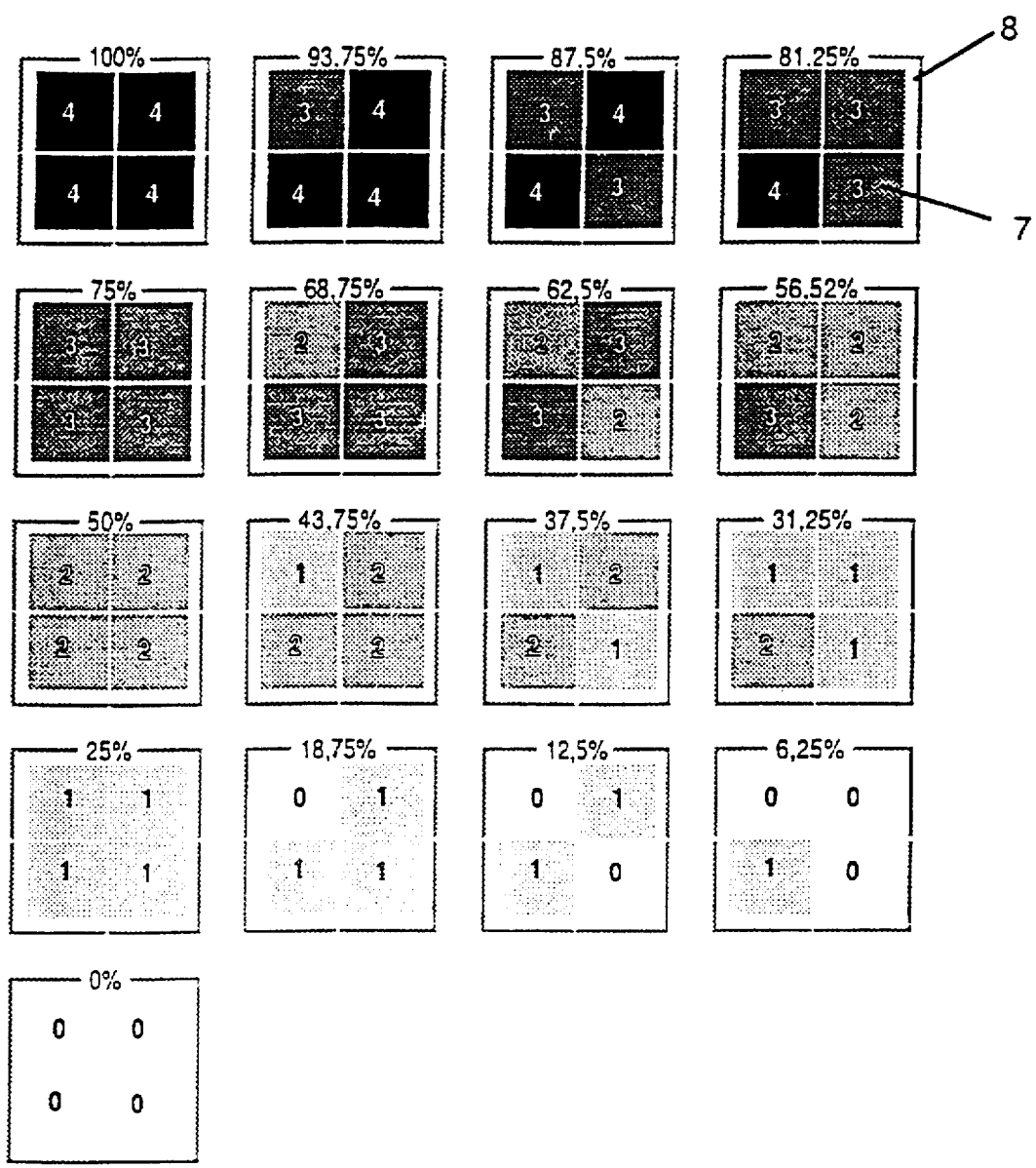
FIG. 10 shows diagrammatically how the dithering technique can be combined with control of the degree of blacking at five levels.

FIGS. 9 and 10 show how the invention can be applied on a printer the controllability of which on the dots 7 follows the one shown in FIGS. 3 and 4, that is, only the blacking degree of the dot can be controlled. The description of this embodiment follows the one given for FIGS. 7 and 8 above. Even here the blacking degree of the dot 7 has to be adapted to the total perception of the grey-tone of the cell 8, so that the different grey-tones of the print distribute evenly over the scale from 100% to 0%.

Figure 11:
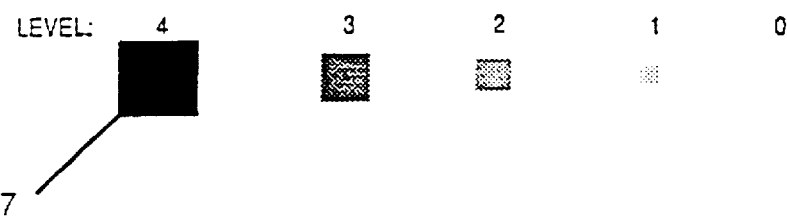
FIG. 11 shows four different degrees of blacking of four dots of different size plus a 0-level which represents the absence of a dot.
Figure 12:
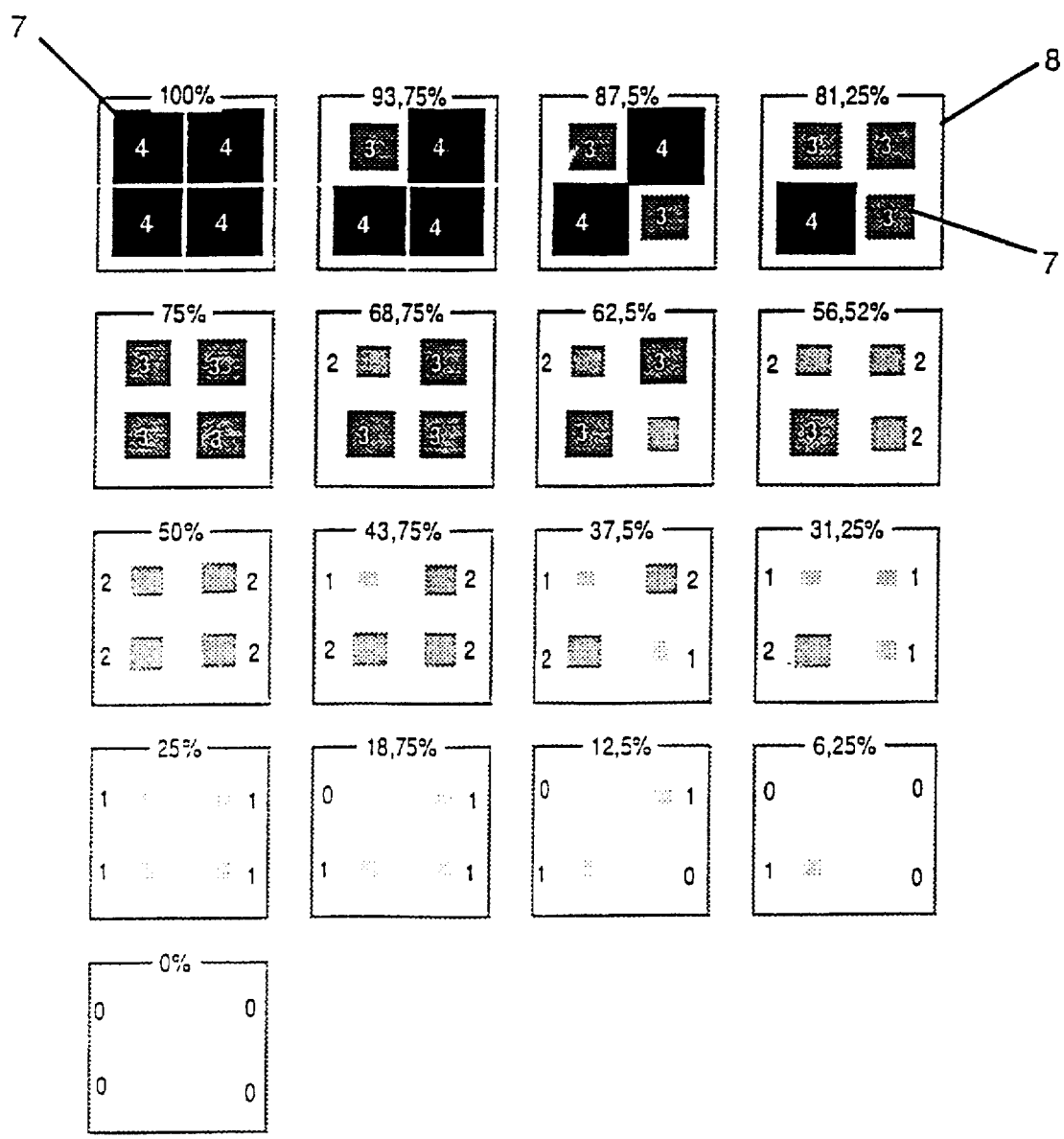
FIG. 12 shows diagrammatically how the dithering technique can be combined control of both the dot size and the dot blackness at five levels.

FIGS. 11 and 12 show how the invention can be applied on a printer the controllability of which on the dots 7 follows the one shown in FIGS. 5 and 6, that is, both the blacking degree and the size of the dot can be controlled. The description of this embodiment follows the one given for FIGS. 7 and 8 above.

Since the DDC-technique has to be explained and illustrated on dot level, unless drawings are made at an enlarged scale it might be difficult to understand the use of the technique. All screen techniques use the limited resolution capability of the eye to distinguish the smallest structure elements of the picture.

Figure 13B:
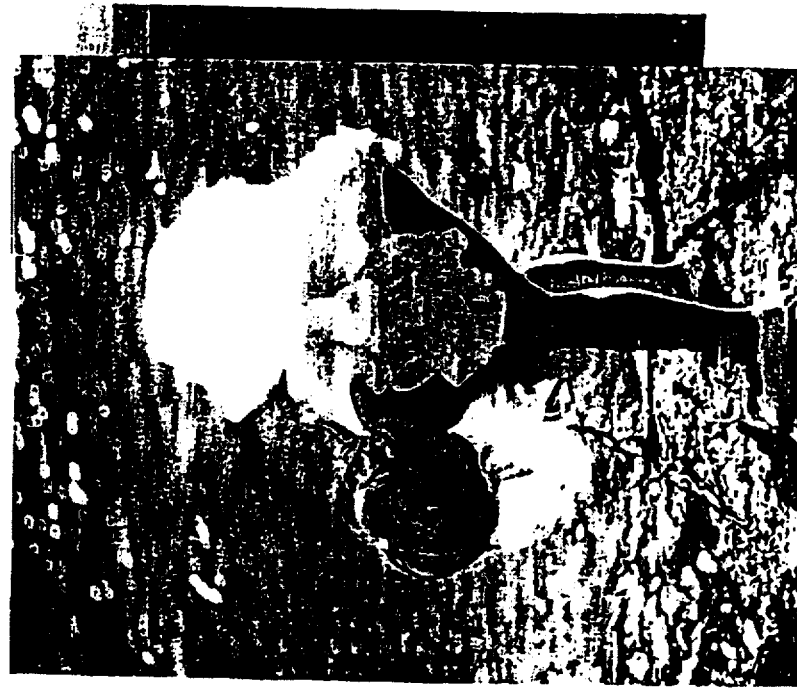
FIGS. 13A and 13B illustrates examples of picture qualities, which can be achieved with the DDC-technique in a 300 dots/inch printer.
Figure 13A:
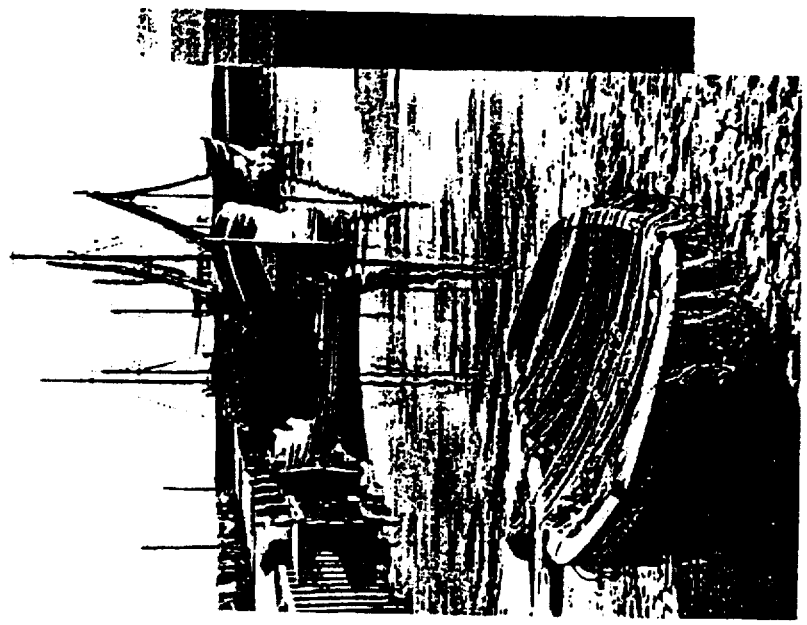

If the quality of the picture is high enough (Q-value larger than about 1500) the human eye without aid can not determine how the cells are built up. This is illustrated in FIGS. 13A and 13B where 18 grey-tones plus a white and a black level has been used in a resolution of 80 cells/inch (that is Q=20×80=1600). In FIG. 15, which has a resolution of 17 grey-tones (Q=1275), the eye is disturbed by the irregularity of the cells. In FIG. 16, which has a more coarse cell resolution than FIG. 15 but has substantially more greytones or cell sizes, the eye cannot distinguish the internal structure of the cell.

A printer which uses DDC with the resolution 300 dots/inch and ability to control the dot size and/or the blackness in e.g. 4 levels plus the white level, can reproduce grey-tone pictures in e.g. a resolution of 75 cells/inch and 75 grey-tones (that is Q=4875) or e.g. 150 cells/inch resolution and 17 grey-tones (that is Q=2550). The corresponding picture quality reproduced by merely conventional dithering technique demands a printer with the resolution 600 dots/inch. Even if the Q-value is a very coarse quality measure, which has been used here only for pedagogical reasons, the invention will substantially improve printing performance at reproduction of grey-tones and color. Moreover it is of course possible that dots of different size and blackness are mixed with each other, so that $4^4$ tones are obtained, if every cell contains 4 dots. If the cells are divided into other patterns, with e.g. 5 or 6 dots in every cell the number of tones in corresponding degree will be larger.

The invention is not limited to embodiments of method described herein. Thus it is possible within the scope of invention to use both fewer and more levels of size and or blackness of the dots in combination with both fewer and more dots in every cell.

A printer with 400 dots/inch with possibility to vary the dot size in e.g. 8 levels thus can reproduce e.g. 128 greytones with the cell resolution 100 dots/inch and a 200 dots/inch printer with possibility to vary the blackness of the dots in two levels plus the purely white level can reproduce 19 grey-tones with the cell resolution 66.7 cells/inch. In the last mentioned case every cell consists of 3×3=9 dots.

Further the pattern according to which the dots are changed in the cell can be freely selected for optimum picture quality within the scope of the invention. The invention is neither restricted to quadratic or circular dots but with advantage can be applied on printer concepts which only can e.g. change the length of the dots in the feeding direction of by e.g. changing the paper speed and/or the printing time for every single dot.

Figure 17:
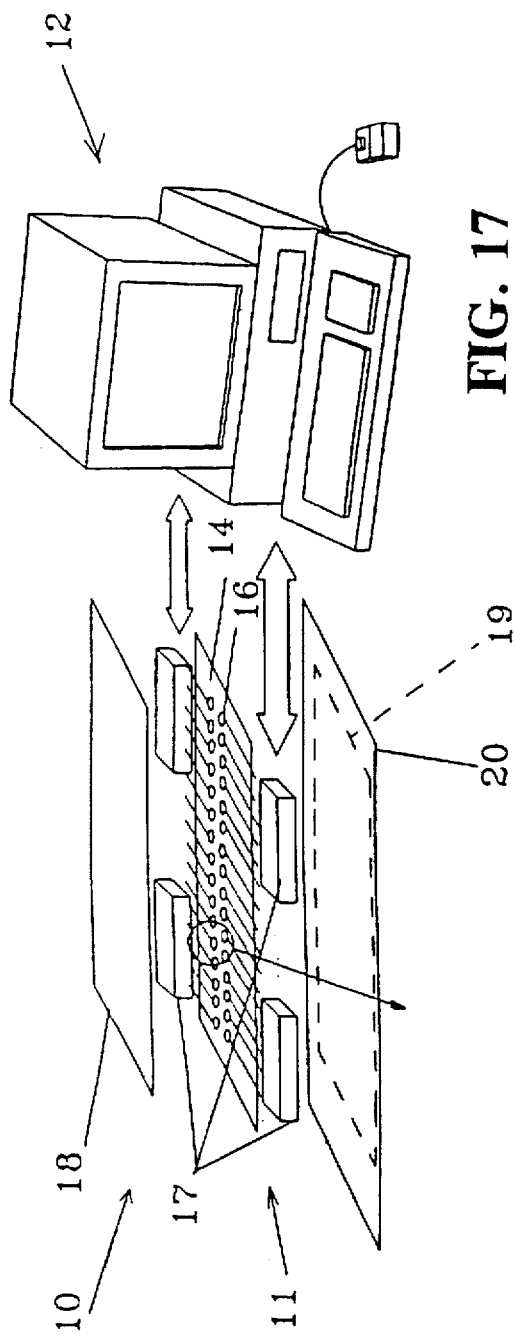
FIG. 17 is a schematic view of a printer unit showing its connection to a computer through a controller.

FIG. 17 shows an arrangement for advantageously implementing the invention. More specifically, FIG. 17 schematically shows an enlarged part of printer unit 10, comprising electrode means 11, and shows its connection to a computer unit 12 through the controller circuits 17. The computer unit 12 generates signals, describing the image to be printed. The control circuits 17 are usually connected to the computer 12 through an interface, not shown here.

Figure 17A:
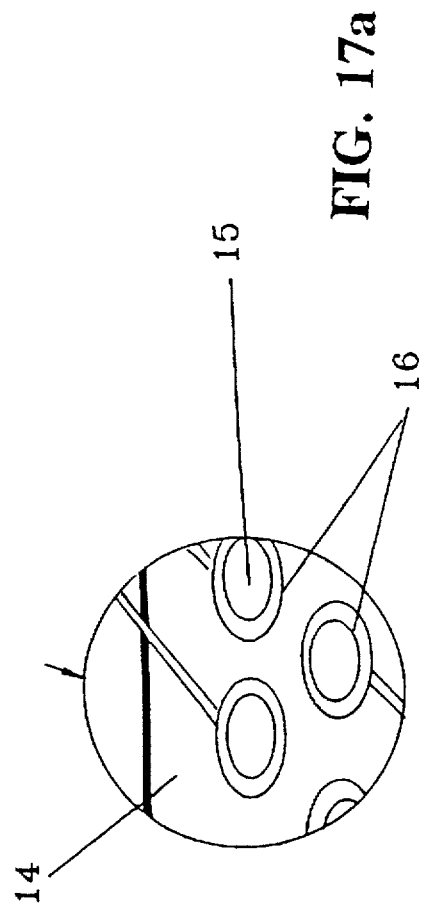
FIGS. 17a is an enlargement of a detail of FIG. 17.

The electrode means 11, in this case, includes a carrier 14 having apertures 15 surrounded by electrodes 16, shown in magnified part in FIG. 17a.

The computer generated signals are translated into appropriate codes and sent to the controller circuits 17 of the printer unit 10, which circuits 17 put out a proper voltage level for at least partly opening and closing passages through the apertures 15 of the electrode means 11. The printer unit 10 also includes a toner carrier 18 and a back electrode 19. Between the toner carrier 18 and the back electrode 19, an information carrier 20, e.g. paper, is insertable. Both the information carrier 20 and/or the electrode means 11 can be arranged movable.

Figure 18:
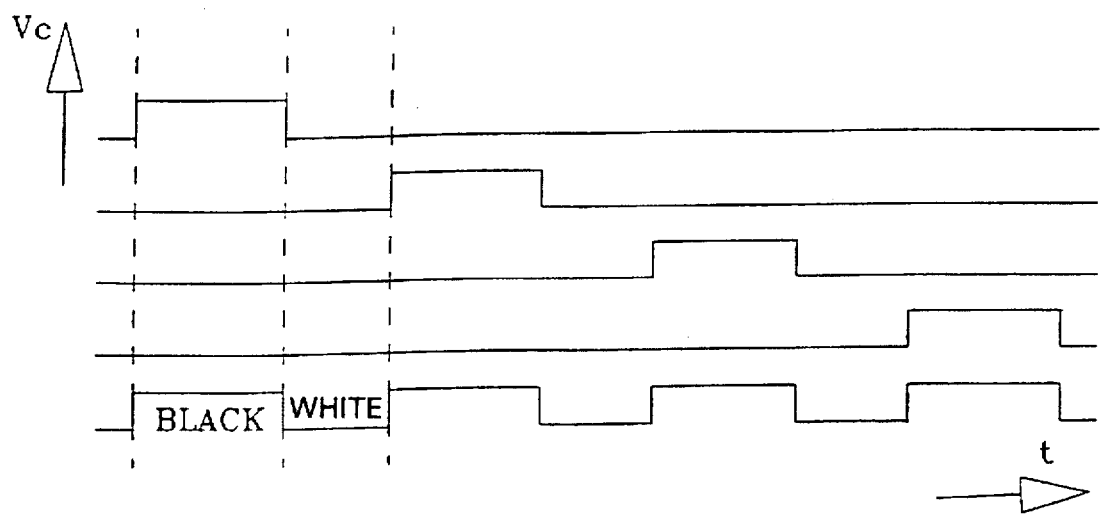
FIG. 18 schematically shows timing diagrams for control voltage levels employed in two methods of image forming.

FIGS. 18 and 19 schematically show timing diagrams for control voltage $V_c$ levels using two methods for image forming. The control voltage is the signal from controller circuits 17 to electrodes 16. In FIG. 18, a conventional printing method is used, i.e. forming only solid black (or any other color) dots. In FIG. 19 gray scale image forming is used.

Due to the longer application time of $V_c$ according to FIG. 18, the passages connected to $V_c$ through the electrode means 11 will be opened a longer time, whereby more toner particles will be transferred onto the paper 20 and consequently more color intensive dots will be produced on the paper 20. By applying shorter $V_c$ pulses according to FIG. 19, the passages through the apertures 15 will be opened a shorter time, resulting in less toner transfer from the toner carrier 18 onto the paper 20. If the $V_c$ output time is divided into 4 periods, a gray scale printing in four levels will be possible.

FIG. 19a shows timing for a dot with varying dot size.

FIG. 19b shows timing for a first level of a gray scale printing, whereby the dot size is ¼ of the dot size of FIG. 19e.

FIG. 19c shows timing for a second level of a gray scale printing, whereby the dot size is 2/4 of the dot size of FIG. 19e.

FIG. 19d shows timing for a third level of a gray scale printing, whereby the dot size is ¾ of the dot size of FIG. 19e.

Figure 21:
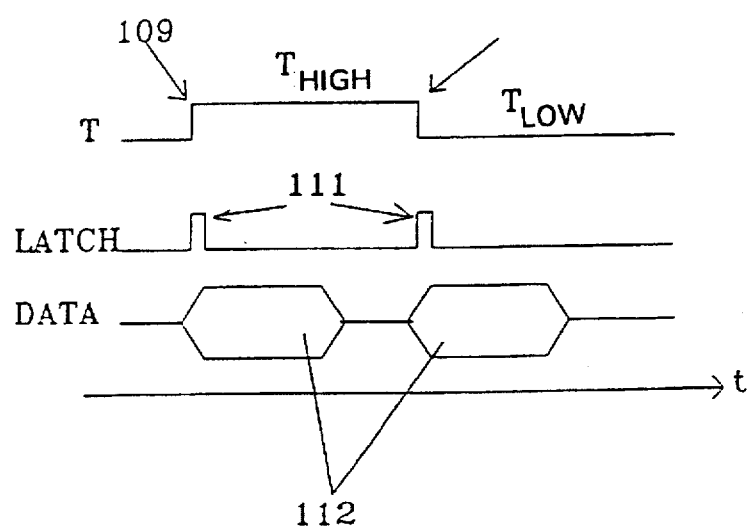
FIGS. 20 and 21 show a flow chart and a timing diagram for conventional printing.
Figure 20:
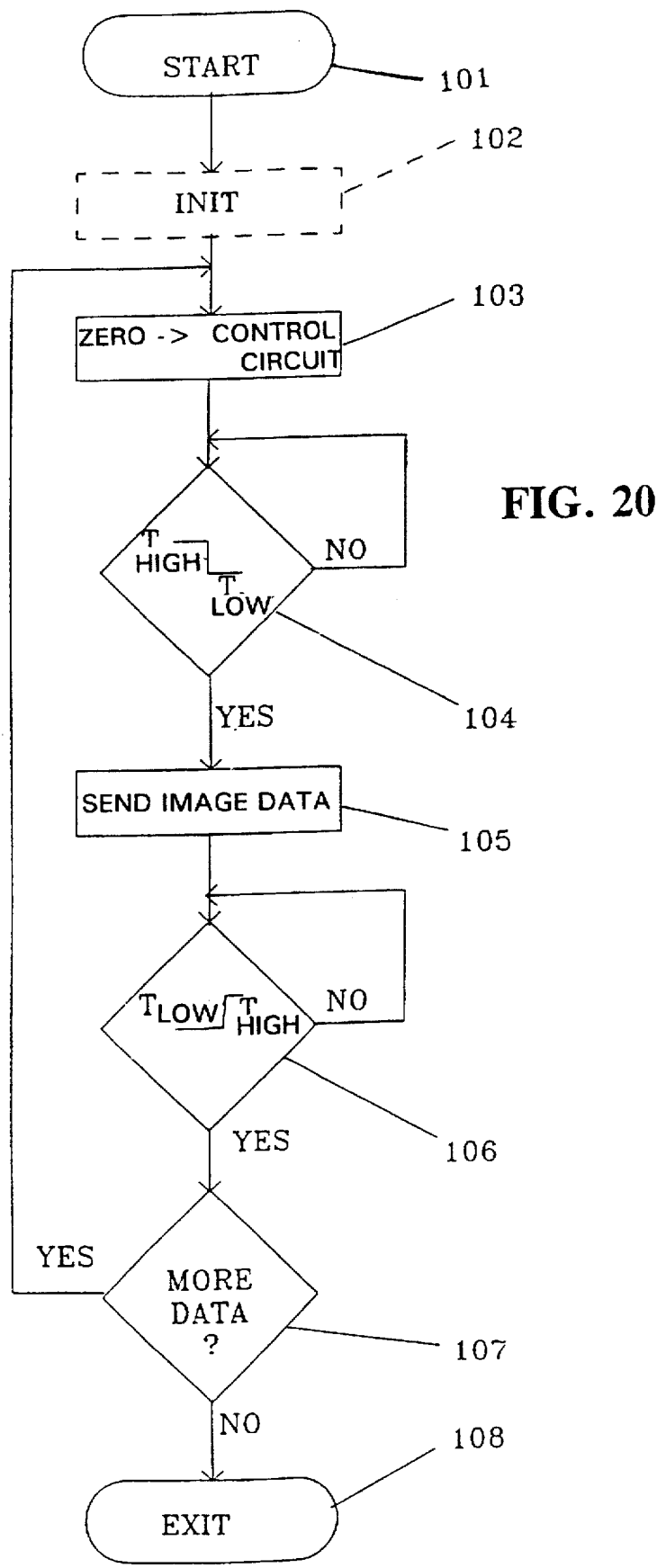

The control of $V_c$ can be obtained directly from the computer unit 12. The flow chart in FIG. 20 and the timing diagram in FIG. 21 illustrate the procedure for a conventional print.

After the procedure start at step 101 a zero signal is sent to the controller circuits, resetting them at step 103 for incoming data. Additional initiation procedure (step 102) may be executed before and/or after resetting. An additional clock can be provided to generate a programmable pulse T as shown in FIG. 21. The alternations of T pulses are monitored at steps 104 and 106, i.e., at positive and negative edges of $T_{high}$ and $T_{low}$, pulses (latches) 111 are generated, which signals the procedure to send at step 105 image data 112 to controller circuits. The procedure is continued until it is determined at step 102 that no more data exists to send, whereby it is terminated at step 108.

Figure 22:
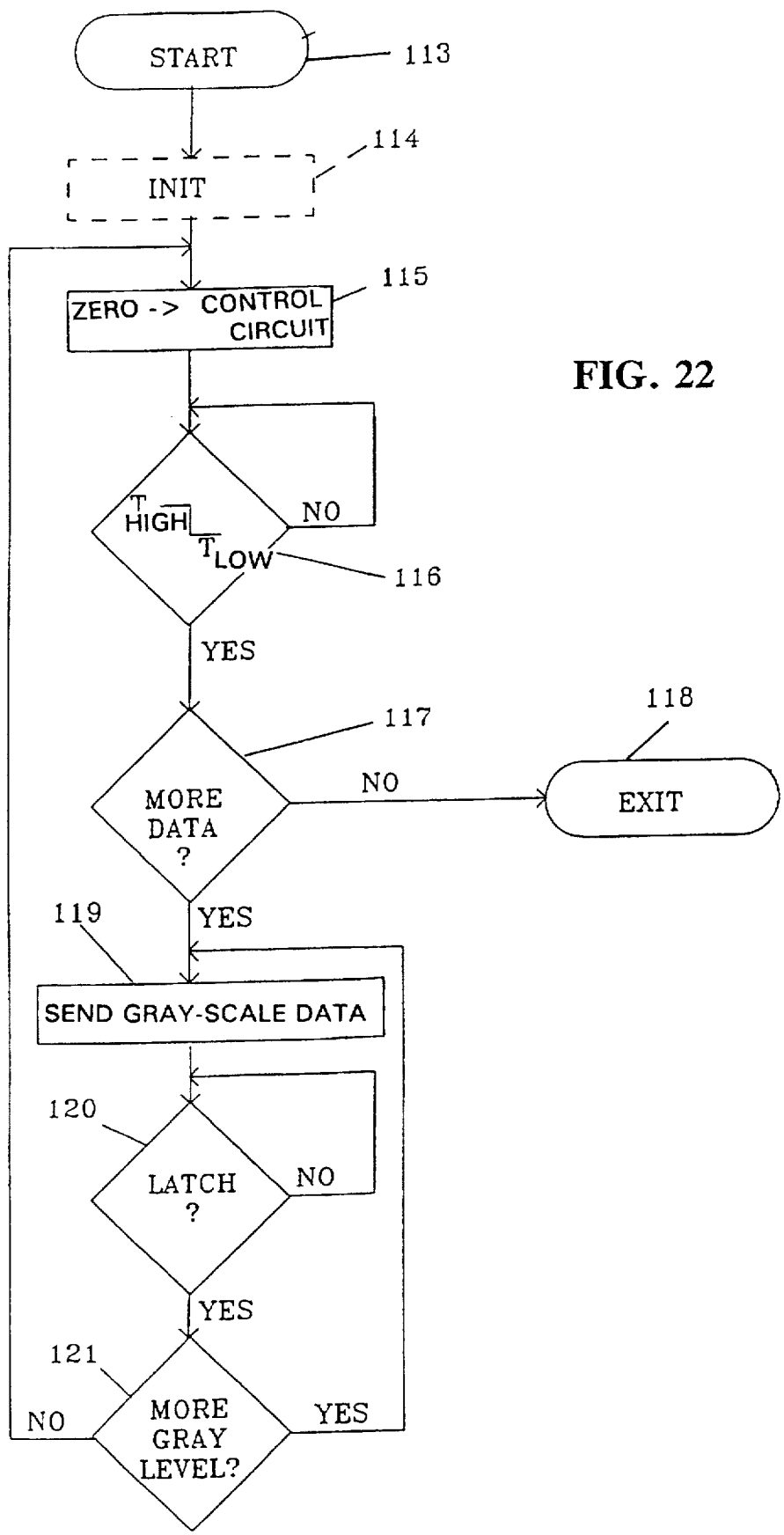
FIGS. 22 is a flow chart of the steps involved in controlling gray scale output in accordance with the invention.

FIG. 22 shows the procedure in accordance with the present invention of controlling gray scale output instructed from the computer. After the procedure start at step 113, a zero signal is sent to the controller circuits, resetting them at step 115 for incoming data. Using additional clock generating pulses T, a time slot is defined, for example during $T_{high}$.

Figure 23:
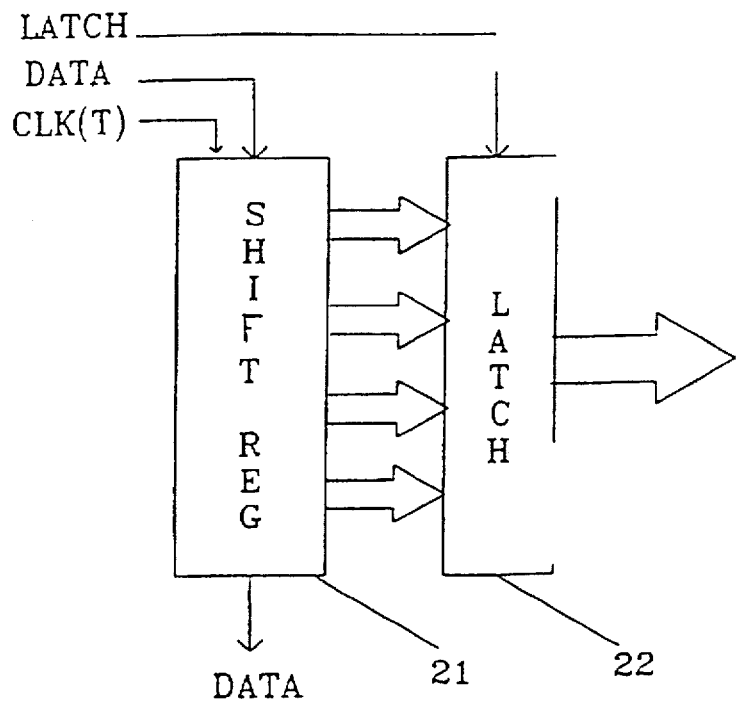
FIG. 23 shows a circuit for sending data to the controller of FIG. 17 to control the gray scale output.

FIG. 23 shows a hardwired part for sending data to controller circuits, which part in its simplest embodiment comprises a shift-register 21 connected to a latch 22 (or other flip-flop circuit). The clock signal T and data(bus) are connected to the shift-register 21, parallel outputs of which are connected to the data inputs of the latch 22.

Figure 24:
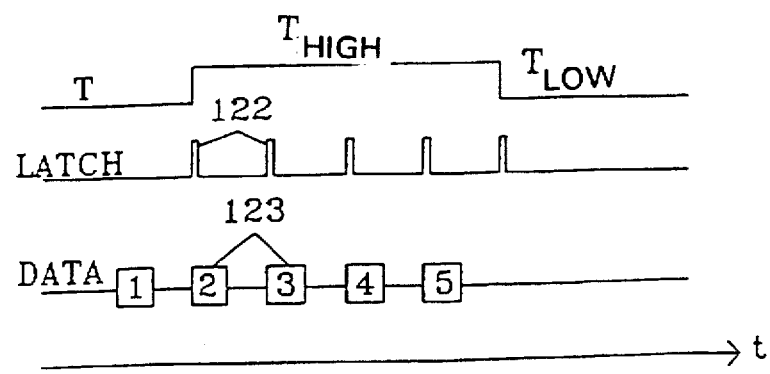

The pulse edges of T are monitored at step 116 and if any data 123, ie. image data, is available to be sent to the controller circuits, the data is shifted into the register 21 and when $T_{high}$, latch signals 122 are generated and the data 123 is sent at step 119 through the latch circuit 22 to the controller circuits at steps 120, 121. FIG. 24 shows diagrammatically the state of data at the input of the latch circuit 22. The procedure is continued until no data is available to be sent to the controller circuits 17.

Figure 25:
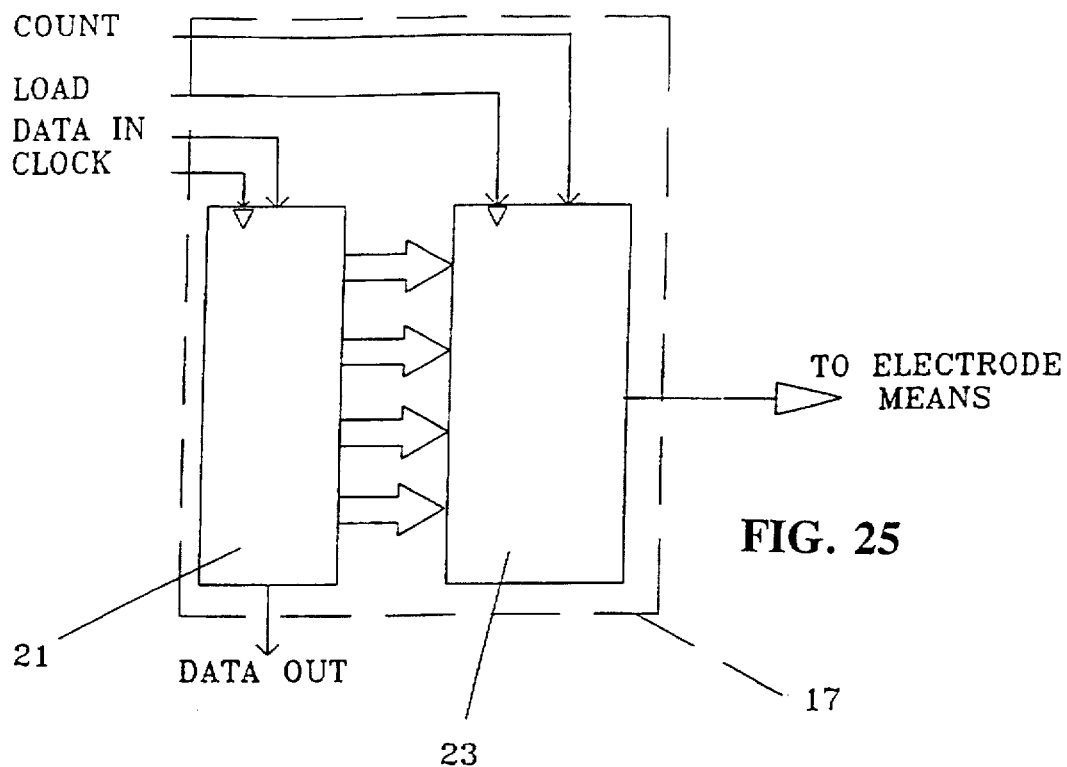
FIGS. 25 and 26 show alternative embodiments for integrating the circuit of FIG. 23 with the controller circuits.
Figure 26:
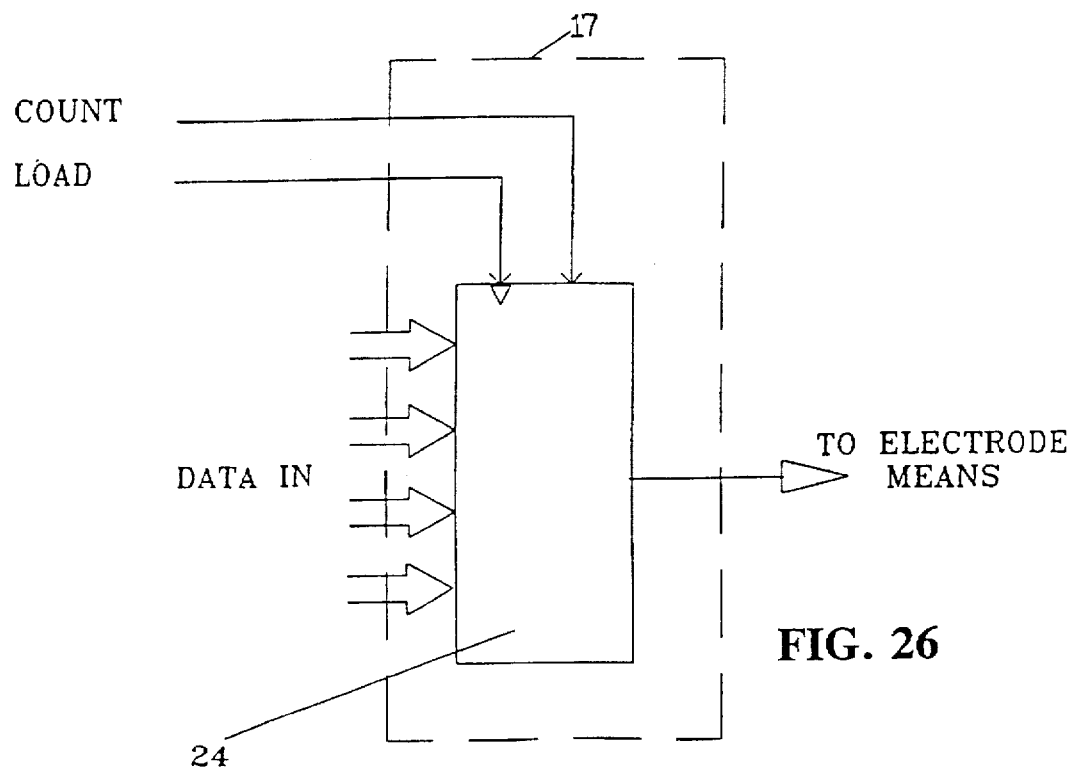

An optimal method is to integrate the hardware for controlling the gray scale output and the controller circuits 17. FIGS. 25 and 26 show alternative embodiments for integrating the hardware. FIG. 25 shows an embodiment in which the controller circuits 17 receive the data serially. In the controller circuit, a shift register 21 is arranged which receives the incoming serial data. The shift register 21 is connected to a counter circuit 23, preferably a down counter. The data is outputted to the counter 23. Each time an edge of "count" signal is detected, the counter 23 counts down 1 step. The counter 23 stops counting at zero (0) and waits for a load signal. The output of the counter, ie. to the electrodes of electrode means, is high until it counts down to zero. When the load signal is received, the data at the input is loaded.

By controlling the count triggering with respect to the time, a time base between the gray scales is determined.

In the diagram of FIG. 26, the shift register is deleted, whereby the data is received by the controller circuit 17 and eventually directly to a counter circuit 24. The function is executed as described above for FIG. 25, and the advantage is the faster data loading and output timing.

FIGS. 27–30 show examples of electrode means 11 and corresponding data output timing diagrams. In FIG. 27, the electrode means includes woven electrodes 16, with apertures 15 between each group of electrodes. Every other electrode 16 in each direction A and B are connected to the same control signals from the driving circuits. To open a "gray scale passage", for example in intersections of $A_1$-$B_1$, $A_1$-$B_2$, $A_2$-$B_1$ and $A_2$-$B_2$, electrodes of the B direction are pulsed with $V_c$ during a period of time and A direction electrodes are pulsed with gray scale controlling data. Of course, it is possible to send gray scale data to electrodes in both directions.

It is also possible to connect the electrodes surrounding each aperture to different voltages, eg $A_{1,1}$, $A_{1,2}$, $B_{2,1}$ and $B_{2,2}$. Assuming that $B_{2,2}$ and $A_{1,2}$ are connected to voltages higher (or lower) than $A_{1,1}$, $B_{2,1}$, in this case a dot with a semi-triangular shape can be produced in aperture AB, and using time and/or voltage level modulation, the produced triangle will have half tone characteristics.

By extending the printing time, ie. allowing a longer aperture opening time and controlling the speed of the paper passing by the electrode means, it is possible to produce oblong solid and/or half tone (when voltage and/or time modulated) lines or patterns.

FIG. 29 shows electrode means comprising apertures 15 surrounded by ring electrodes 16. Each electrode is controlled by its own $V_c$, as illustrated in FIG. 30.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Method of halftone printing in which an information carrier is brought into electrical cooperation with an electrode matrix, the information carrier being movable relative to the electrode matrix, and the electrode matrix including electrodes connectable to at least one voltage source for applying a voltage level to the electrodes for a duration of time, the electrodes forming a number of cells for creating images, each cell including a plurality of dots, which method comprises:

individually controlling the size, shape and/or amount of color of each dot such that the dots form a preselected pattern in which at least some of the dots vary in amount of color from other of the dots, the size of the dots and the amount of color being controlled by changing the speed of movement of the information carrier relative to the electrode matrix, the voltage level applied to and/or the application time of the voltage applied to the electrodes of the electrode matrix.

2. Method according to claim 1, in which the voltage source is derived from control means including a control circuit for receiving image data and in which the method further includes:

(a) defining a time slot;

(b) monitoring the time slot to determine if any image data is available to be sent to the control circuit;

(c) sending the image data to the control circuit; and (d) repeating steps (b) and (c) until no image data is available.

3. Method according to claim 2, in which the control means includes a latch and the image data is sent through the latch circuit to the control circuit.

4. Method according to claim 2, in which the control means includes a latch and a counter and the image data is sent through the latch and the counter to the control circuit.

5. Apparatus for halftone printing in which an information carrier is brought into electrical cooperation with an electrode matrix, the information carrier and the electrode matrix being movable relative to each other, and the electrode matrix including electrodes connectable to at least one voltage source, the electrodes forming a number of cells for creating images, each cell including a plurality of dots, which apparatus comprises:

means for individually controlling the size, shape and/or amount of color of each dot in accordance with received image data such that the dots form a preselected pattern in which at least some of the dots vary in amount of color from other of the dots, the individually controlling means including means for changing the speed of movement of the information carrier and the electrode matrix relative to each other, the voltage level applied and/or the application time of the voltage applied to the electrodes of the electrode matrix.

6. Apparatus according to claim 5, wherein the electrode matrix comprises apertures at least partly surrounded by the electrodes.

7. Apparatus according to claim 5, wherein the electrode matrix comprises a plurality of conductors arranged on an insulating member having pervious holes and the holes are surrounded by said conductors.

8. Apparatus according to claim 5, in which the control means comprises first and second circuits and the image data is serially sent to the first circuit and is outputted from the first circuit in parallel form to the second circuit, the second circuit being time controlled to provide data to the electrode means with a predetermined frequency.

9. Apparatus according to claim 8, in which the first and second circuits form an integrated unit.

10. Apparatus according to claim 5, in which the control means includes a time controlled circuit for receiving and outputting the data with a predetermined frequency.

11. Apparatus according to claim 5, wherein the electrode matrix includes a net of electrodes, surrounding a plurality of apertures, each electrode being connected to the at least one voltage source, the output of which is controllable in respect of the voltage output, time and/or the voltage level.

12. Method for improving the quality of printing and increasing printing speed in a printing device when producing halftone images on an information carrier, wherein said device includes control means and at least one printer means having at least one print element which controls transportation of a coloring agent from a carrier towards the information carrier and being arranged to produce dots, which method comprises:

generating with said printer means a number of cells for creating images, each cell comprising at least one dot; and controlling simultaneously the color value and size of each individual dot in each cell by controlling said print element by control signals from said control means to form a pattern which is variable with respect to the number of dots and the colour value and size of the dots.

13. Device for improving the quality of printing and increasing printing speed in a printing device when producing halftone images on an information carrier, which device comprises:

at least one printer means comprising at least one print element, said print element being arranged to control transportation of a coloring agent from a carrier towards said information carrier to produce dots, and said printer means being arranged to generate a number of cells for creating images, each cell comprising at least one dot;

control means for generating control signals to control said printer element to produce said dots; and said print means being further arranged to simultaneously control, in response to control signals from said control means, the color value and size of each individual dot in each cell to enable forming of a pattern which varies with respect to the number of dots and the color value and size of the dots.

14. Method to improve quality of printing when producing halftone images on an information carrier using at least one printer, in which a number of cells are used for creating images, each cell including a number of dots, the method comprising:

varying the number of dots in at least some of the cells; and controlling the color value and size of each dot in the cells, so that the dots in each cell form a preselected pattern wherein the pattern in some of the cells varies from the pattern in other of the cells with respect to the number of dots, the color value and the size of the dots.

* * * * *